United States Patent [19]

Carpenter

[11] Patent Number: 5,941,612
[45] Date of Patent: Aug. 24, 1999

[54] METHOD AND APPARATUS FOR TESTING AN ABS ELECTRONIC CONTROL UNIT MICROPROCESSOR

[75] Inventor: Scott E. Carpenter, Westland, Mich.

[73] Assignee: Kelsey-Hayes Company, Livonia, Mich.

[21] Appl. No.: 08/856,831

[22] Filed: May 15, 1997

Related U.S. Application Data

[60] Provisional application No. 60/017,805, May 17, 1996.

[51] Int. Cl.⁶ ....................................................... B60T 8/32
[52] U.S. Cl. ............... 303/122; 303/122.01; 303/122.02; 303/122.08
[58] Field of Search ............................ 303/121, 122.08, 303/122.04, 122.05, 122.06, 122, 122.01, 122.02, 122.03; 395/183.01, 183.03, 183.06, 183.22, 183.04, 500; 371/21.1, 22.1; 702/58, 183; 188/181 C; 701/29, 31, 33, 34, 35, 76, 70, 92, 97

[56] References Cited

U.S. PATENT DOCUMENTS

| | | |
|---|---|---|
| 3,838,260 | 9/1974 | Nelson . |
| 4,322,846 | 3/1982 | Carroll et al. . |
| 4,433,413 | 2/1984 | Fasang . |
| 5,072,418 | 12/1991 | Boutaud . |
| 5,548,713 | 8/1996 | Petry et al. . |
| 5,657,330 | 8/1997 | Matsumoto . |

Primary Examiner—Douglas C. Butler
Attorney, Agent, or Firm—MacMillian, Sobanski & Todd, LLC

[57] ABSTRACT

A controller for a hydraulic control system includes a microprocessor having a diagnostic routine. The diagnostic routine is operable to exercise an arithmetic logic unit within the microprocessor to verify that the arithmetic logic unit is functioning properly. Upon detection of a malfunction of the arithmetic logic unit, the diagnostic routine disables the hydraulic control system and generates a warning signal.

18 Claims, 7 Drawing Sheets

METHOD AND APPARATUS FOR TESTING AN ABS ELECTRONIC CONTROL UNIT MICROPROCESSOR

CROSS REFERENCE TO RELATED APPLICATION

This application claims the benefit of U.S. Provisional Application No. 60/017,805, filed May 17, 1996.

BACKGROUND OF THE INVENTION

This invention relates in general to anti-lock brake systems and in particular a method and apparatus for testing the operation of a microprocessor arithmetic logic unit in an anti-lock brake system control module.

An Anti-lock Brake System (ABS) is often included as standard or optional equipment on new vehicles. When actuated, the ABS is operative to control the operation of some or all of the vehicle wheel brakes. A typical ABS includes a plurality of solenoid valves mounted within a control valve and connected to the vehicle hydraulic brake system. Usually, a separate hydraulic source, such as a motor driven pump, is included in the ABS for reapplying hydraulic pressure to the controlled wheel brakes during an ABS braking cycle. An ABS further includes an electronic control module which is electrically connected to wheel speed sensors mounted adjacent to the controlled wheels, the solenoid valves and pump motor. The control module can be mounted directly upon the control valve or located remotely therefrom. The control module includes a microprocessor which is programmed to control the ABS in accordance with algorithms and parameters permanently stored in a read only memory (ROM). The microprocessor also can access a random access memory (RAM) for temporary storage and retrieval of data.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is responsive thereto to close a power relay. The power relay controls the supply of electric power to enable the solenoid valves and the pump motor. The microprocessor selectively actuates the solenoid valves in the control valve in accordance with algorithms in the ROM to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle.

Upon actuation, the ABS preempts control of the vehicle brakes from the vehicle operator. Accordingly, a typical ABS includes a number of diagnostic tests to assure that the ABS is functioning properly. Upon initial power up of the ABS, which occurs every time the ignition switch is actuated, the microprocessor performs a check sum on the control algorithm by cycling through all the instructions included in the algorithms stored in the ROM. The bits remaining in the microprocessor accumulator following each instruction are added to produce a cumulative total. The cumulative total is subtracted from an expected total. If the resulting difference is non-zero, the ABS is disabled and a warning light on the dash board illuminated to inform the vehicle operator that service is needed for the ABS.

Also, upon initial power up, the microprocessor will test the RAM by storing first a one, and then a zero in each bit in the RAM. After each entry, the microprocessor will interrogate each bit to verify that the correct entry is present. If a difference occurs, the ABS is disabled and the warning light illuminated.

During ABS braking cycles, when the power relay is closed, various electrical outputs are periodically tested to verify operation of the solenoid valves, pump motor and power relay. If the tests indicate a malfunction, an error code is generated which causes the ABS to be disabled and the warning light illuminated.

SUMMARY

This invention relates to a method and apparatus for testing the operation of a microprocessor arithmetic logic unit in an anti-lock brake system control module.

As described above, it is known for the microprocessor in an ABS electronic control unit to perform a check sum upon the control algorithm and to test the memory upon initial vehicle start up. Additionally, the microprocessor monitors the operation of specific hardware components in the ABS which are external to the microprocessor, such as the valves, pump motor and power relay. However, it also is desirable to test the operation of the microprocessor arithmetic control unit (ALU) during vehicle operation to assure that the microprocessor is functioning properly.

The present invention concerns a controller which includes a microprocessor adapted to operate an associated control system. The microprocessor has an arithmetic logic unit which is operable to perform specific operational functions. The present invention contemplates a diagnostic subroutine which is accessible to the microprocessor and operable to exercise a specific arithmetic logic unit operational function to verify that the microprocessor can correctly execute the arithmetic logic unit operational function. The invention also contemplates that the microprocessor is operative to periodically run the diagnostic subroutine to confirm continued proper operation of the microprocessor arithmetic logic unit. Additionally, the diagnostic subroutine can be operable to test a plurality of arithmetic logic unit operational functions of the microprocessor. The controller also can include a memory coupled to the microprocessor with the diagnostic subroutine stored in the memory.

The invention also contemplates that the associated control system is an anti-lock brake control system and that the controller is included in an anti-lock brake control system controller with the memory having an anti-lock brake control algorithm stored therein. The controller is operative in accordance with the anti-lock brake control algorithm to control the anti-lock brake system, and the arithmetic logic unit operational functions verified by the diagnostic subroutine are required during the operation of the anti-lock brake control algorithm.

Alternately, the associated control system can be a traction control system with the controller included in a traction control system controller and the memory having a traction control algorithm stored therein. The controller is operative in accordance with the traction control algorithm to control the traction control system, and the arithmetic logic unit operational functions verified by the diagnostic subroutine are required during the operation of the traction control algorithm.

The invention further contemplates a method for testing a microprocessor in an ABS control module. The ABS has a control valve connected to at least one wheel brake in the brake system of a vehicle, a speed sensor for monitoring the speed of the vehicle wheel associated with the controlled wheel brake and a central control unit including a microprocessor having an arithmetic logic unit. The microprocessor is operative in accordance with a control algorithm and upon detecting a potential lock-up of the wheel associated with the controlled wheel brake to selectively operate the control valve to prevent lock-up of the controlled wheel. The microprocessor further has access to a diagnostic subroutine which is operative to exercise a specific operational function of the microprocessor to verify that the microprocessor arithmetic logic unit can correctly execute the operational function. The diagnostic subroutine is run periodically to verify that the microprocessor arithmetic logic unit is functioning properly.

Upon detection of a microprocessor malfunction, the ABS system is disabled and a warning signal is sent to the vehicle operator.

Additionally, the diagnostic subroutine can be operative to exercise the microprocessor to verify that the microprocessor can correctly execute a plurality of arithmetic logic unit operational functions which are included in the control algorithm.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
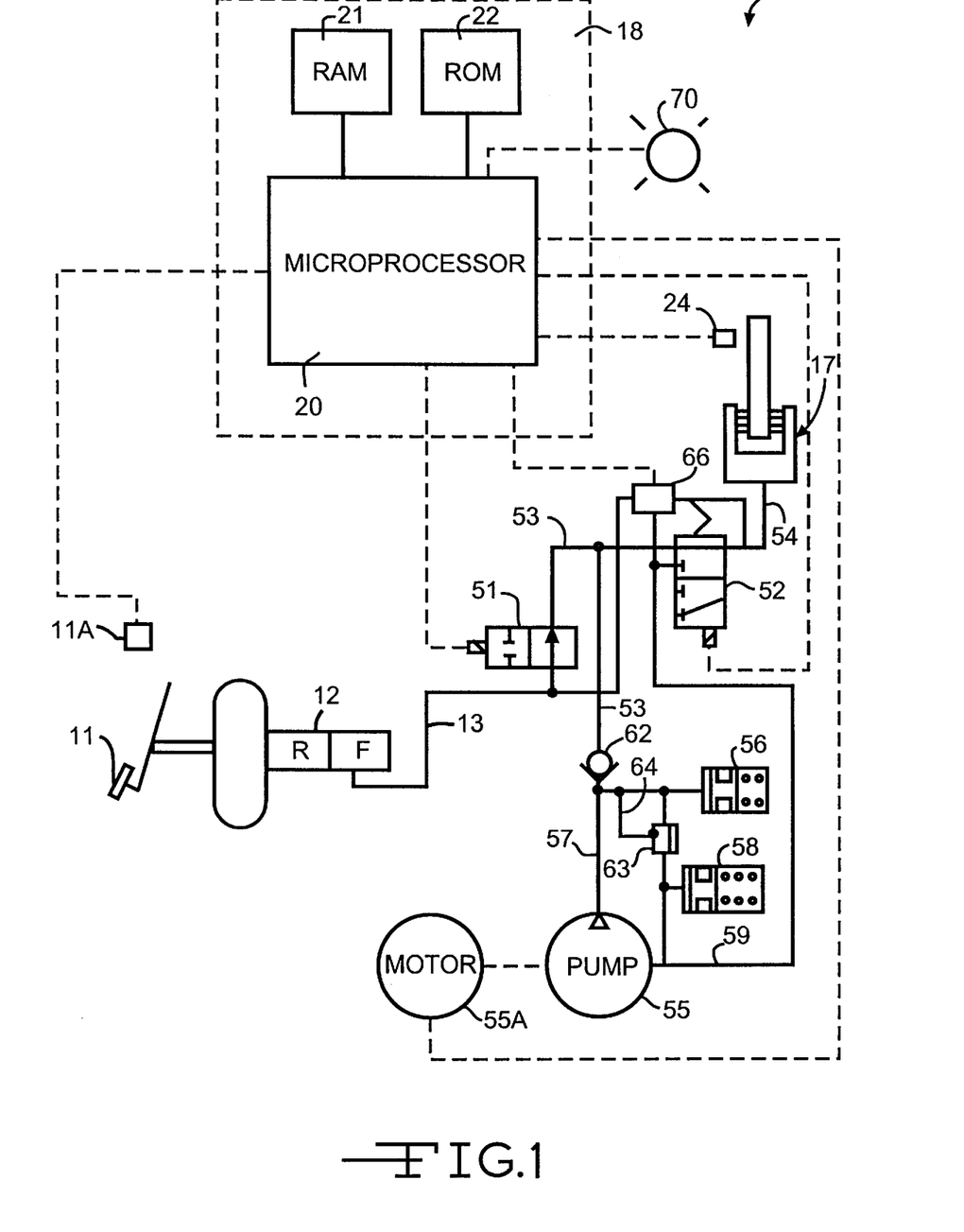
FIG. 1 is a schematic diagram of a portion of a typical anti-lock brake system.

Referring now to the figures, there is shown in FIG. 1 a schematic diagram of a portion of a typical anti-lock brake system 10. For simplicity, only one wheel brake has been included; however, it will be appreciated that the anti-lock brake system (ABS) 10 can control any number of wheel brakes on a vehicle. It should be noted that, in FIG. 1, hydraulic fluid connections between components are represented by solid lines, while electrical connections are represented by long dashed lines, and mechanical connections are shown as dashed lines.

A portion of a conventional vehicle hydraulic brake system also is illustrated in FIG. 1. The conventional brake system includes a vehicle brake pedal 11 which operates a conventional brake light switch 11a. The brake pedal 11 is connected by a conventional linkage to a dual reservoir tandem master brake cylinder 12. When the brake pedal 11 is depressed by the vehicle operator, the master cylinder 12 supplies hydraulic fluid under pressure to a front brake circuit through line 13 and to a rear brake circuit (not shown). For simplicity, only a right front brake 17 is shown in FIG. 1.

The ABS 10 includes a central electronic control unit 18 which includes a microprocessor 20, such as an Intel 87C196. The control unit 18 also includes a random access memory (RAM) 21 and a read only memory (ROM) 22. While the RAM 21 and ROM 22 are shown in FIG. 1 as separate components, it will be appreciated that the RAM and ROM can be integrated into the microprocessor 20. As shown in FIG. 1, the microprocessor 20 is electrically connected to, and receives signals from, the brake light switch 11a and a right front wheel speed sensor 24. As will be explained below, the microprocessor 20 also is electrically connected to the other electrical components in the ABS 10.

As also shown in FIG. 1, pressurized brake fluid in the line 13 is supplied to the right front wheel brake 17 through an isolation valve 51 and a three-way pressure control valve 52. An intermediate supply line 53 is connected between the isolation valve 51 and one port of the three-way valve 52, while a final supply line 54 is connected between a second port of the three-way valve 52 and the brake 17. The valves 51 and 52 are solenoid actuated and electrically connected to the microprocessor 20.

A pump 55 operated by a motor 55a has an outlet port connected to a high pressure accumulator 56 by a high pressure line 57, and an inlet port connected to a low pressure accumulator 58 by a low pressure line 59. The high pressure line 57 is connected to the right front intermediate supply line 53 through a check valve 62. The low pressure line 59 is connected to the third port of the three-way valve 52. A high pressure by-pass valve 63 is connected between the high and low pressure lines 57 and 59, and has a sensing line 64 connected to monitor the fluid pressure in the high pressure line 57.

A reset switch 66, which is associated with the right front wheel brake 17, is connected to monitor the pressure in lines 13, 54 and 59. When the ABS 10 is operating in the anti-lock mode, the reset switch 66 monitors the differential pressure between the master cylinder 12 and the brake final supply line 54. When the ABS 10 is not operating in the anti-lock mode, the reset switch 66 monitors the condition of the three-way valve 52. In the former use, the reset switch 66 detects when the operator reduces pressure on the brake pedal 11 by detecting that the brake fluid pressure in the supply line 13 is less than the brake fluid pressure in the final supply line 54. When this condition occurs, the reset switch 66 generates a signal to the microprocessor 20 to terminate the anti-lock brake mode. In the latter use, upon detecting a potentially defective three-way valve 52, the reset switch 66 generates a signal to the microprocessor 20 to disable the ABS 10 and illuminate a brake failure warning light 70 on the vehicle dashboard to alert the vehicle operator.

Figure 2:
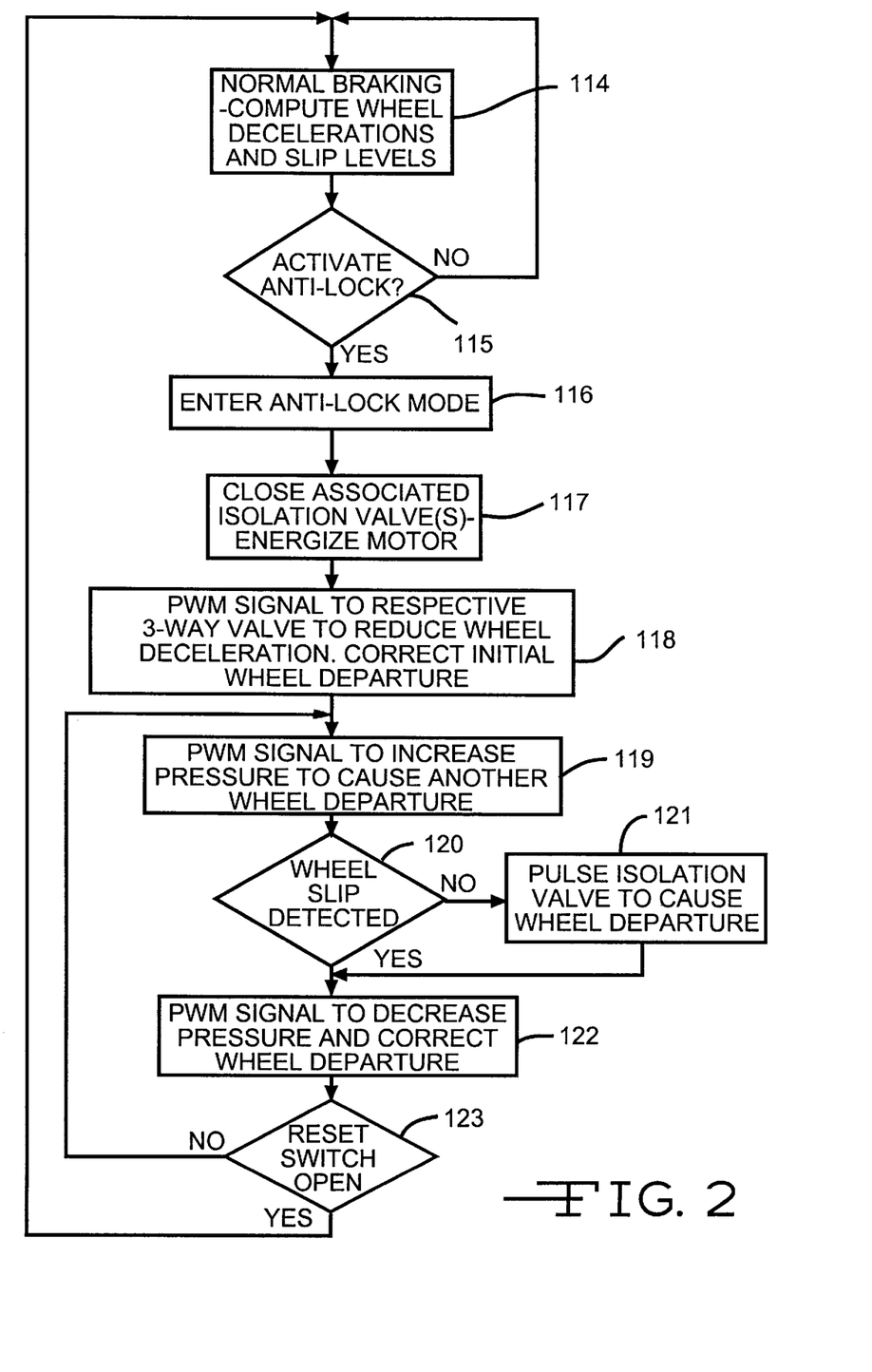
FIG. 2 is a simplified flow diagram showing the basic operation of the anti-lock brake system in FIG. 1.

Referring now to FIG. 2, there is shown a simplified flow diagram illustrating the basic operation of a typical ABS control algorithm for the microprocessor 20. In FIG. 2, a processing function 114 represents "normal" vehicle operation and braking conditions under which the ABS has not been activated and the vehicle brake pressure is under full control of the vehicle operator. During such braking conditions, the microprocessor 20 senses the actual wheel speed and calculates the deceleration and slip of the controlled wheel. The deceleration and slip are compared to predetermined anti-lock actuation thresholds. This comparison is represented by the decision point 115 wherein, if no anti-lock actuation threshold has been exceeded, the system remains in the normal operating mode 114 and continues to monitor the speed of the controlled wheel. In the preferred embodiment, the microprocessor 20 senses the wheel speed periodically, as determined by the ABS iteration rate. The microprocessor determines the condition of the vehicle wheel from the sensed wheel speed.

In the event that an anti-lock actuation threshold has been exceeded, the ABS 10 enters an anti-lock mode at 116 to initiate an anti-lock braking cycle. The microprocessor 20 executes a processing function 117 to close the isolation valve 51 and, simultaneously, energize the motor 55a to operate the pump 55. Next, the ABS 10 enters a processing function 118 wherein the microprocessor 20 generates a pulse width modulated (PWM) signal which is supplied to the three-way valve 52 at a predetermined duty cycle to reduce brake pressure at a predetermined rate. The particular duty cycle is of the PWM signal is typically a function of the current wheel deceleration and slip levels.

Once the brake pressure reduction has reduced the wheel deceleration to a predetermined level and the wheel speed brought back up to the vehicle speed, the ABS 10 enters a processing function 119 wherein the microprocessor 20 changes the duty cycle of the PWM signal to cause to the three-way valve 52 to quickly increase the pressure to the brake 17 to attempt to cause another wheel speed departure. The system 10 then enters a decision point 120 to determine whether or not the increase in pressure provided by operating the three-way valve 52 has resulted in a sufficient increase in pressure to cause another wheel speed departure. If not, the program branches at "NO" and enters a processing function 121 wherein the isolation valve 51 is temporarily pulsed open by the microprocessor 20 to provide additional fluid pressure to the brake 17 to cause another wheel speed departure. The system 10 then enters a processing function 122, similar to the processing function 118, wherein the microprocessor 20 again generates a PWM signal which is supplied to the three-way valve 52 to decrease pressure and correct the wheel speed departure.

The processing functions 118 and 122 which involve generating a PWM signal typically include several iterations of a subroutine (not shown). Each iteration is triggered by an internal clock in the microprocessor 20. In the preferred embodiment, iterations occur at a predetermined intervals, which are typically several milliseconds in duration.

From this point, the system 10 enters a decision point 123 to check the status of the reset switch 66. If the reset switch 66 is open, this indicates that the vehicle operator has relieved the pressure on the brake pedal 11 sufficiently that the master cylinder pressure has fallen below the controlled pressure to the brake 17. In this situation, anti-lock braking control is no longer required, and the system 10 branches at "YES", terminates the anti-lock braking cycle and the ABS 10 returns to the normal braking mode. However, if the reset switch 66 is closed, the system 10 branches at "NO" and returns to the processing function 119 to maintain anti-lock braking control and cause another wheel speed departure.

The specific ABS and control algorithm explained above and illustrated in FIGS. 1 and 2 are intended to be illustrative of typical systems and control algorithms. However, it will be appreciated that the invention can be practiced with an ABS having another physical configuration and other algorithms than described above. While only a portion of a typical anti-lock brake circuit has been illustrated in FIG. 1, complete typical anti-lock brake circuits are shown in U.S. Pat. No. 4,865,399, which is incorporated herein by reference. Additionally, the invention can be practiced on anti-lock brake systems which do not include a pump to supply pressurized brake fluid. Such a system is shown in U.S. Pat. No. 4,790,607, which also is incorporated herein by reference.

The present invention contemplates including a diagnostic subroutine to confirm that the Arithmetic Logic Unit (ALU) in the microprocessor 20 is properly functioning. The ALU is a portion of a Register Arithmetic-Logic Unit (RALU) which processes arithmetic and logical operations. The RALU is included in the microprocessor Central Processing Unit (CPU) and typically includes the ALU, a Program Status Word (PSW), a master Program Counter (PC), a microcode engine, a loop counter and a plurality of registers.

The diagnostic subroutine exercises each individual operational function used by the microprocessor ALU during execution of the ABS control algorithm. A specific ALU diagnostic subroutine is developed for a particular ABS configuration by reviewing the ALU instructions exercised during operation of the ABS algorithm. The resulting list of instructions is incorporated in the ALU diagnostic subroutine.

Figure 3:
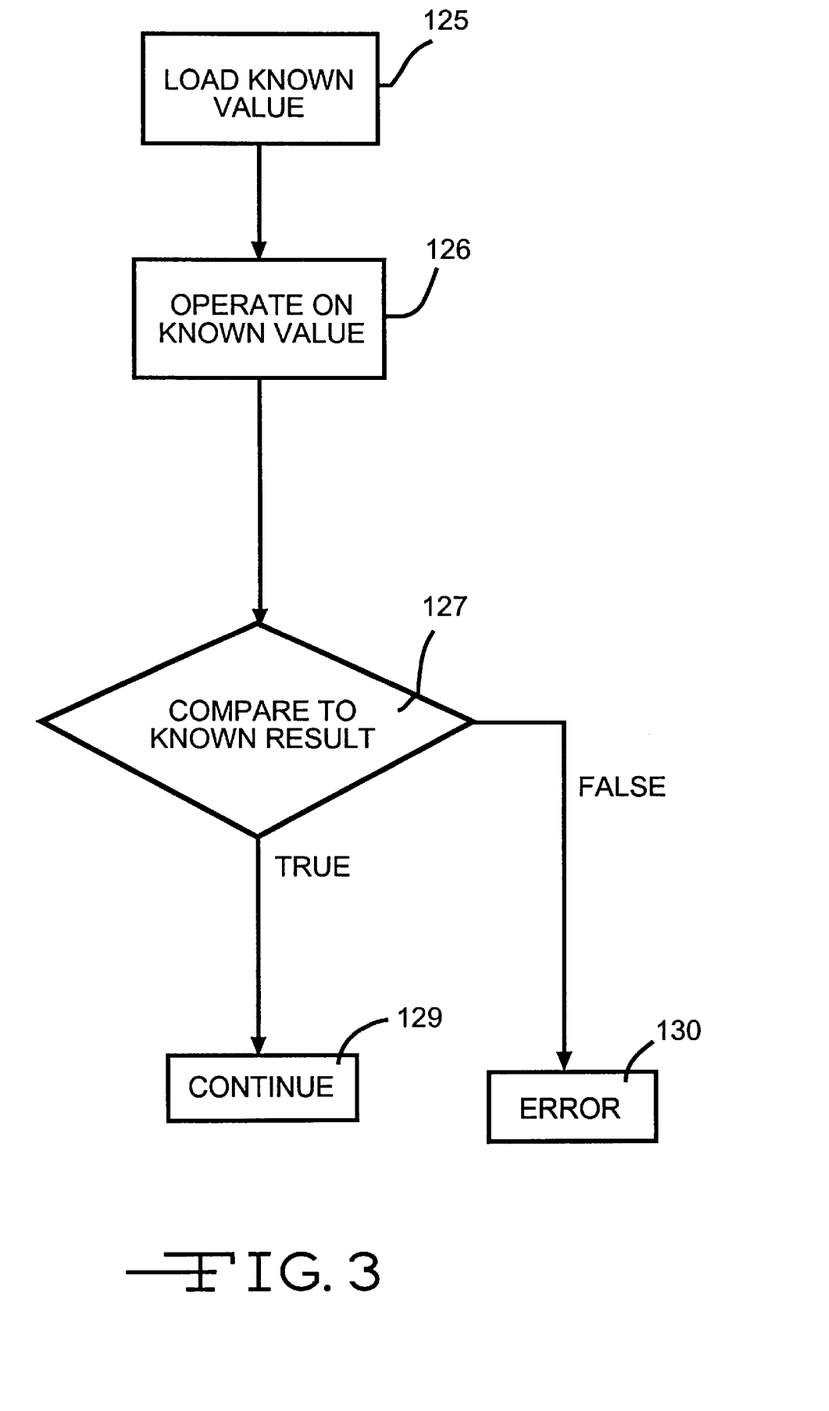
FIG. 3 is a flow chart showing a diagnostic test in accordance with the invention for an arithmetic logic unit which is included in the anti-lock brake system shown in FIG. 1.

The ALU diagnostic subroutine sequentially executes each ALU instruction to produce a result which is compared to an expected result, as illustrated in the flow chart shown in FIG. 3. In functional block 125, a known value is loaded into a microprocessor register. A specified microprocessor ALU function then operates upon the known value in functional block 126. The result is compared to an expected result in decision block 127. If the expected result is not obtained, the ALU diagnostic subroutine transfers to a functional fault block 128 labeled "ERROR". Upon transfer to the fault block 128, the ABS 10 is disabled and the warning light 70 is illuminated. Upon obtaining the expected result, the program continues, as shown by functional block 129.

In the preferred embodiment, the ALU diagnostic subroutine is run periodically while the vehicle ignition is on. The ALU diagnostic subroutine is called during the iterative portions of the control algorithm. Thus, for the control algorithm illustrated in FIG. 2, the diagnostic subroutine would be run during each iteration of the algorithms included in each of the processing functions shown in functional blocks 114, 118 and 122. Operation of the ALU diagnostic during normal vehicle and brake operation, as shown by functional block 114, assures that the ALU is operational, even if the ABS is not actuated for an extended period of time.

Figure 4:
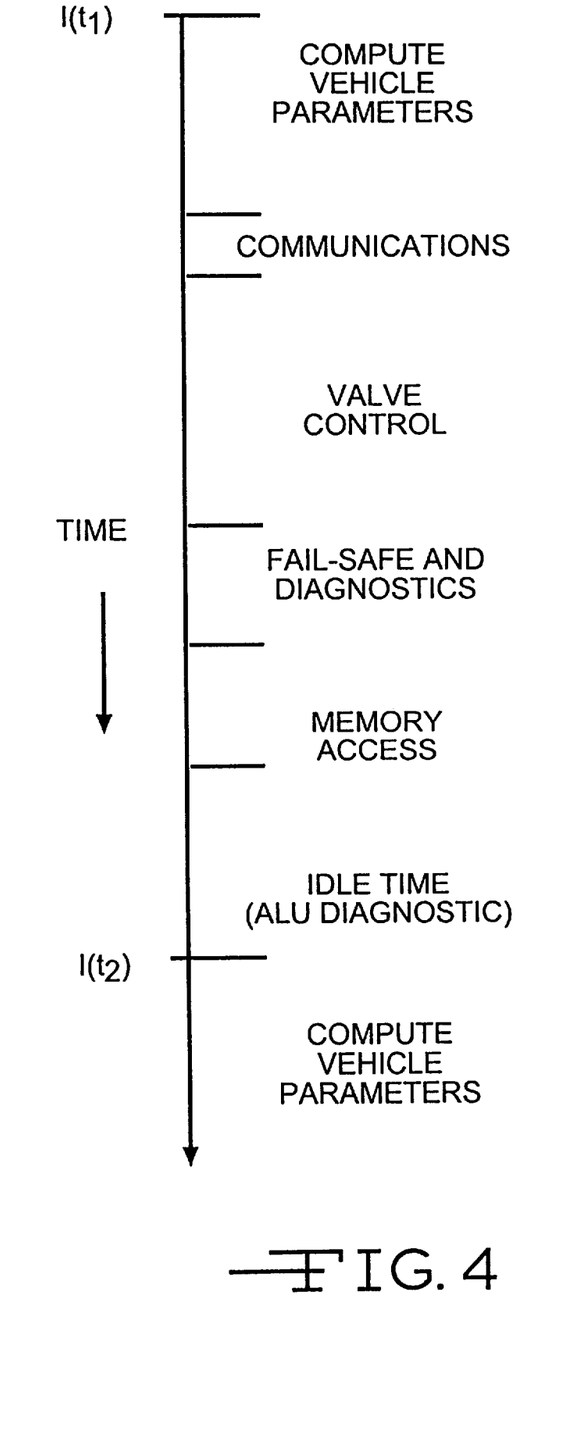
FIG. 4 is a time diagram illustrating an iteration of the anti-lock brake system shown in FIG. 1.

The sequencing of functions by the microprocessor is illustrated by a time line in FIG. 4. In FIG. 4, the vertical line represents time. The beginning of a control algorithm iteration is labeled I($t_n$). The iteration begins with the microprocessor computing vehicle parameters, such as wheel speed and wheel deceleration. During a communications period, the microprocessor communicates with other vehicle modules, for example, the microprocessor could illuminate a message lamp on the vehicle dashboard during this period. Next the solenoid valves are operated as required to correct any wheel speed departure. Fail-safe and diagnostic subroutines are run to determine that the solenoid valves, pump motor and power relay are functioning properly. Finally, the memory is accessed to store any applicable diagnostic codes generated during the tests. Then the microprocessor is idle until the start of the next iteration. This idle time is used to run the ALU diagnostic subroutine.

As shown in FIG. 4, there is sufficient idle time remaining during each of the iterations to allow the complete running of the ALU diagnostic subroutine for the microprocessor without disrupting the normal operation of the ABS. In the preferred embodiment, the ALU diagnostic routine includes approximately 80 instructions and requires approximately 100 microseconds to run. It will be appreciated the sequencing of functions shown in FIG. 4 is meant to be illustrative, and that specific details may vary from system to system.

In the preferred embodiment, the following microprocessor ALU operational functions are checked during operation of the ALU diagnostic subroutine:
   arithmetic;
   comparison of values;
   logical and/or functions; and
   jump functions, both conditional and unconditional.

It will be appreciated that the invention can be practiced with more, less or different ALU functions than shown in the above list.

Figure 5A:
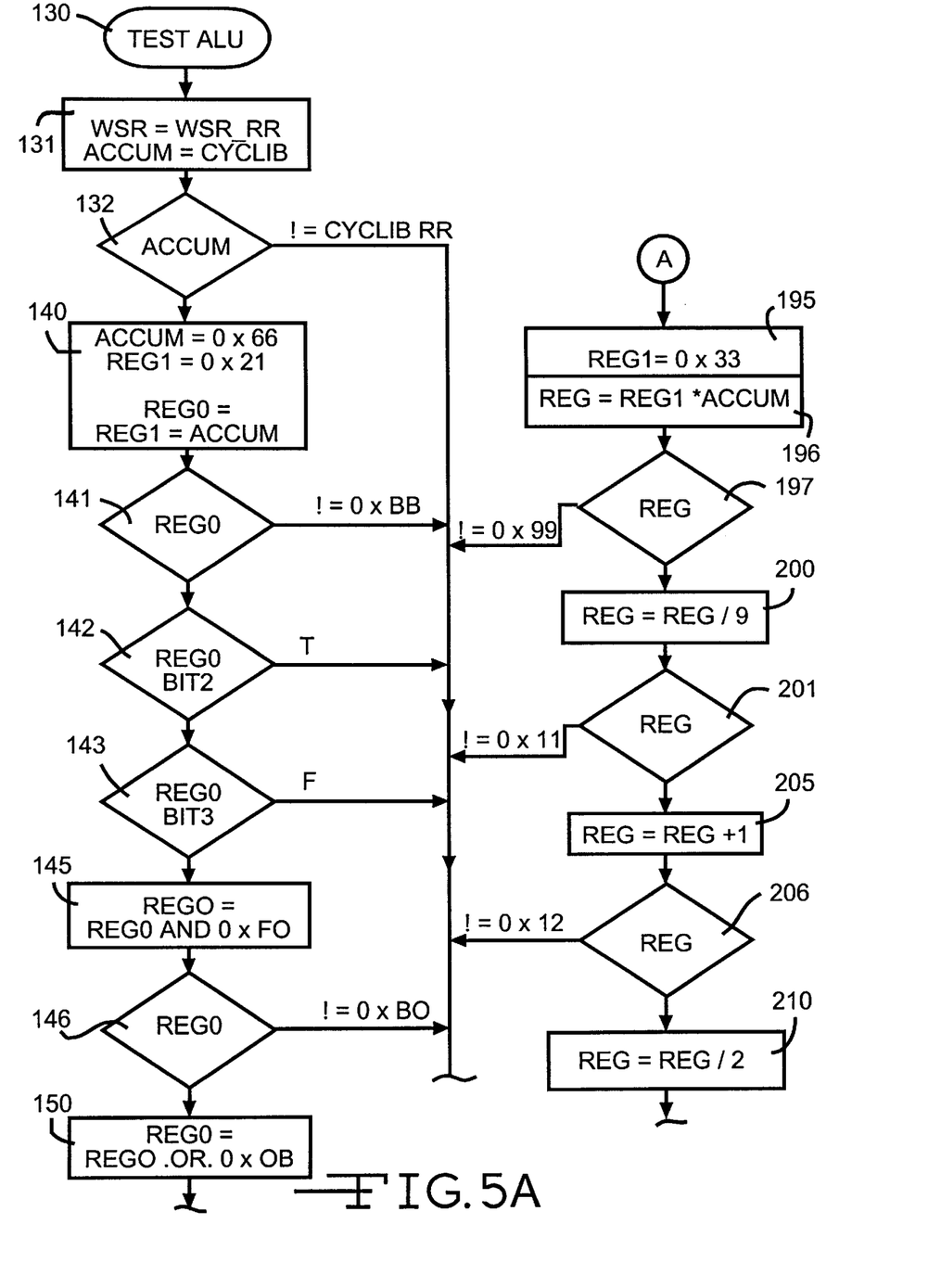
FIG. 5 is a flow diagram showing the diagnostic test illustrated in FIG. 3 applied to an ABS control unit microprocessor.
Figure 5B:
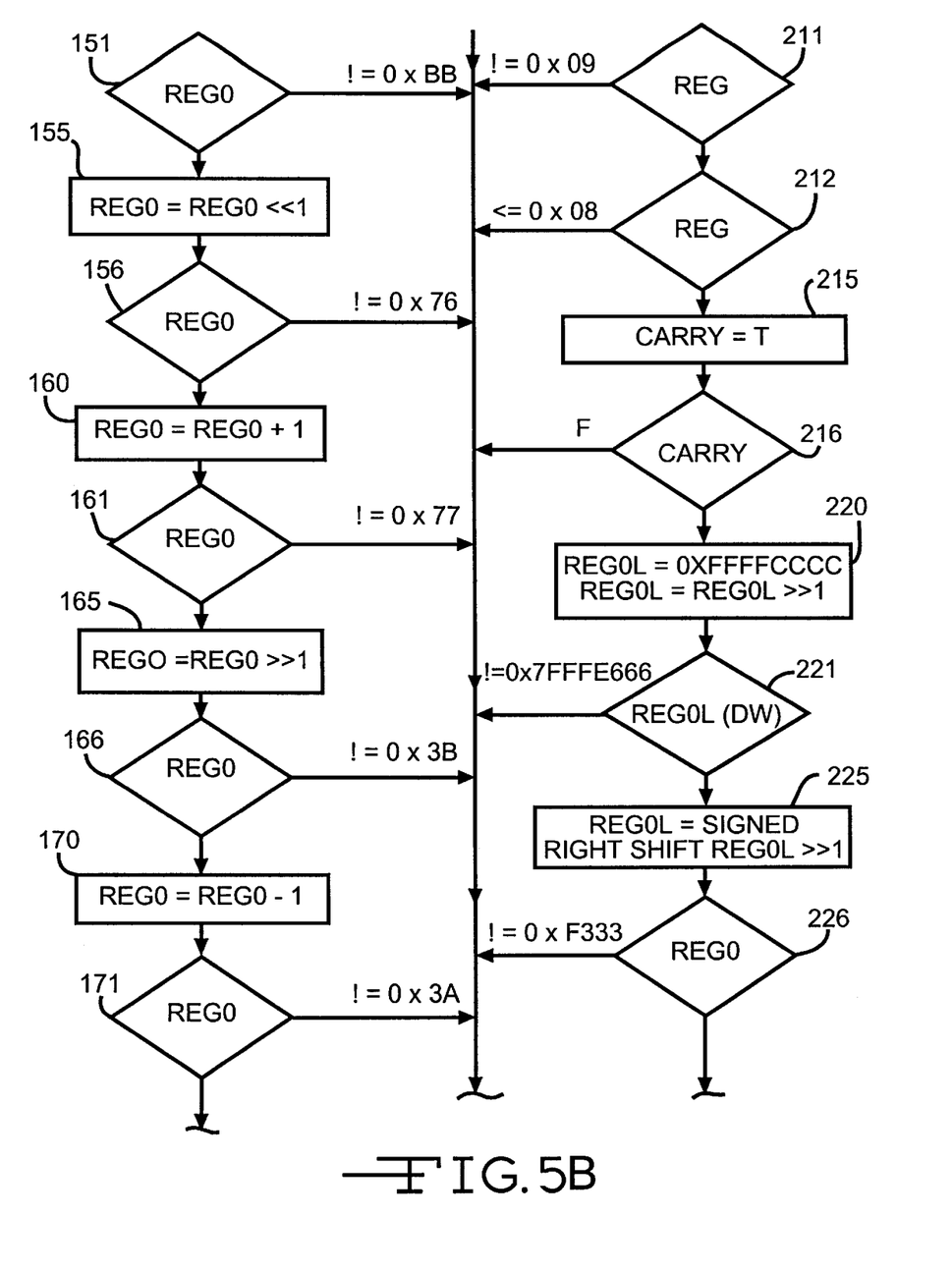
Figure 5C:
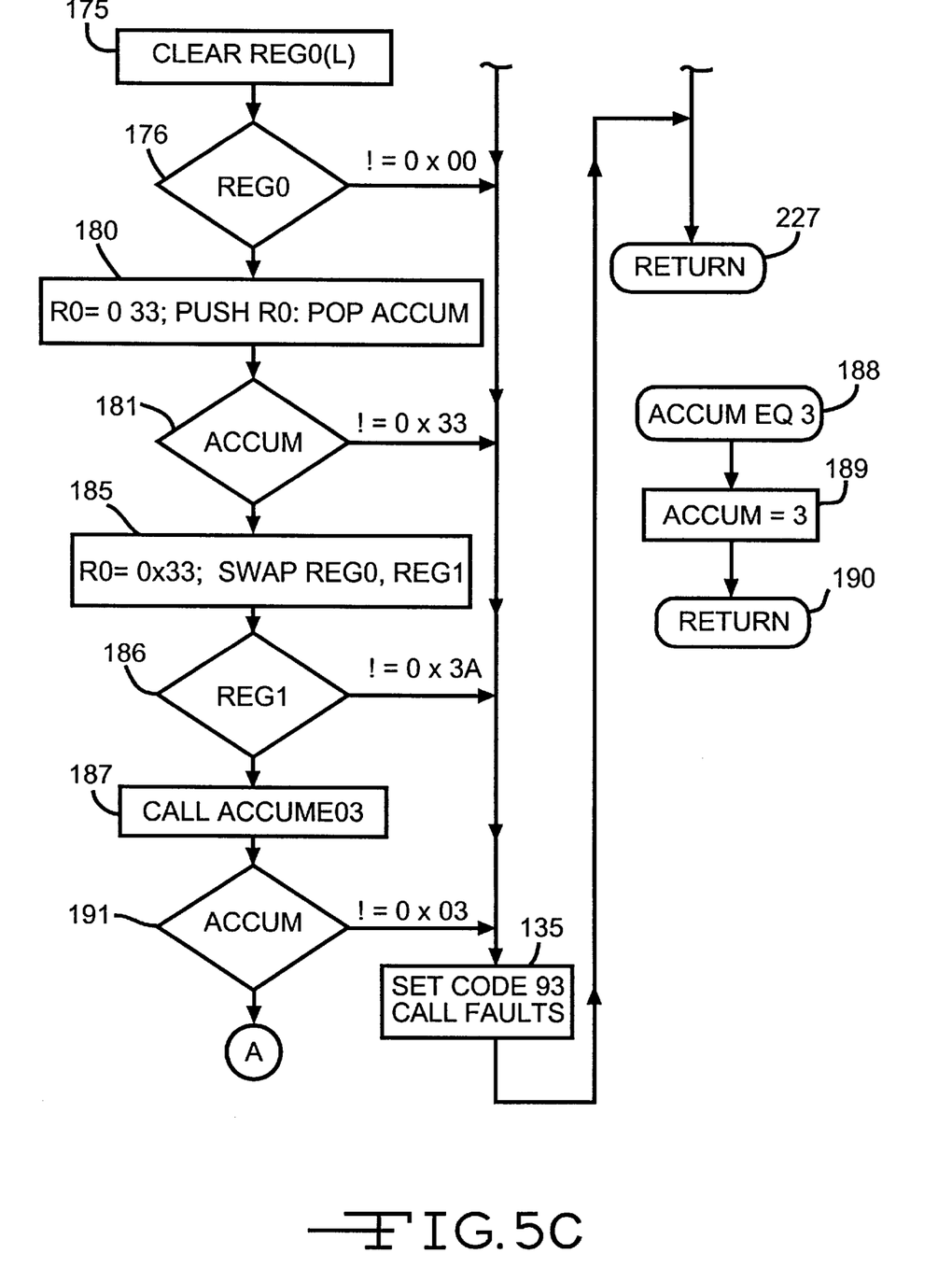

An exemplary ALU diagnostic subroutine is illustrated for a particular ABS by the flow diagram shown in FIG. 5. The ALU diagnostic subroutine illustrated in FIG. 5 could be included as a portion of each of the iterative algorithms included in the processing functions shown in FIG. 3. Alternately, a return address can be temporarily stored in a register in the RAM and a common ALU diagnostic subroutine called. Upon completion of the ALU diagnostic subroutine, the stored address would be accessed to return the Central Processing Unit (CPU) to the next step of the algorithm.

The subroutine begins when the program transfers to block 130. First the functioning of the Window Select Register (WSR), which is used to select a particular vehicle wheel, is tested. In functional block 131, the WSR is loaded with "WSR_RR", which is the address of the right rear wheel and the Accumulator (ACCUM) is loaded with CYCL1B. If the microprocessor ALU is functioning properly, the ACCUM entry will be compared to the WSR to form the complete variable name "CYCL1B_RR" for the right rear wheel, which is then loaded into the ACCUM.

In decision block 132, the content of the ACCUM is compared to the word CYCL1B_RR to verify proper operation of the microprocessor 20. If the value CYCL1B_RR is not actually in the ACCUM, the subroutine transfers to functional fault block 135 where code 93 is set in an error code register and a faults subroutine (not shown) is initiated. The faults subroutine disables the ABS 10 and illuminates the light 70 to warn the Vehicle operator that the ABS 10 should be serviced. If the ACCUM does contain CYCL1B_RR in decision block 132, the diagnostic subroutine continues.

As was explained above, any incorrect test result causes the diagnostic subroutine to stop and transfers control to finctional block 135. The faults subroutine does not include the capability to indicate which instruction was faulty and caused the ABS to be disabled. This is determined at a service center by running a separate diagnostic routine.

Subtract and jump instructions are tested next. In functional block 140, the hexadecimal number 66 is loaded into the ACCUM and hexadecimal number 21 is loaded into Register1 (REG1), which, in the preferred embodiment, is one of the general memory locations in the microprocessor 20. The contents of the ACCUM are then subtracted from the contents of REG1 and the difference loaded into Register 0 (REG0), which is another general memory location in the microprocessor 20. If the subtraction instruction is functioning properly, the subtraction operation should produce a difference of BB, in hexadecimal. The subtraction instruction is verified in decision block 141 where the contents of REG0 is compared to BB. If REG1 does not contain BB, the program transfers to the fault block 135. If BB is present in REG1, the subroutine continues.

The instruction Jump if Bit is Set (JBS) is verified in decision block 142 by causing the microprocessor to check the contents of a specified bit position in the register REG0. The bit positions in a register are designated from right to left as: zero bit position, first bit position, second bit position, ect. As shown in decision block 142, the second bit position in REG0 is checked. According to the JBS instruction, if the second bit position contains a one, or is "set", a "jump" will be effected by adding an offset to the program counter, while if the second bit position contains a zero, or is "clear", control passes to the next sequential instruction in the subroutine.

A jump offset is selected which transfers, or "jumps" the subroutine to the fault block 135. If the microprocessor ALU is operating properly, the register REG0 contains 1011 1011 in binary and the second bit position in the register, which corresponds to the third digit from the right in the binary number, holds a zero causing control to pass to the next sequential step. If, however, a malfunction has occurred, the second bit position in the register will contain a one. The resulting true response to the JBS instruction will jump the subroutine to the fault block 135.

The next sequential step in the subroutine is a test of the instruction Jump if Bit is Clear (JBC) in functional block 143. As shown in decision block 143, the third bit position in register REG0 is checked. According to the JBC instruction, if the third bit position is clear, a jump will be effected by adding an offset to the program counter, while if the third bit position is set, control passes to the next sequential instruction. Again, a jump offset is selected which transfers, or "jumps" the subroutine to the fault block 135.

As discussed above, if the microprocessor ALU is functioning properly, the register REG0 contains the binary number 1011 1011 and the third bit position in the register, which corresponds to the fourth digit from the right, will contain a one, causing control to pass to the next sequential step to test the AND instruction. If, however, a malfunction has occurred, the third bit position in the register will contain a zero. As a result, the JBC instruction will jump the subroutine to the fault block 135.

In functional block 145, the contents of the REG0 register are combined with the hexadecimal number F0 in accordance with the AND instruction and the resulting number is loaded into register REG0. If the microprocessor ALU is operating correctly, this operation will produce the hexadecimal number B0. The content of the REG0 register is checked in decision block 146. If the contents of REG0 do not equal B0, the subroutine transfers to the fault block 135. If the contents of REG0 do equal B0, the subroutine proceeds to cause the microprocessor 20 to combine the contents of the REG0 register with the hexadecimal number 0B in accordance with the OR instruction in functional block 150. If the microprocessor ALU is operating correctly, this operation will produce the hexadecimal number BB, which will again be in register REG0. The content of the register REG0 is checked in decision block 151. If the contents of REG0 do not equal BB, the subroutine transfers to the fault block 135. If the contents of REG0 do equal BB, the subroutine continues.

In functional block 155, the Shift Byte Left (SHLB) instruction is tested by shifting the contents of REG0 one bit to the left and filling the right bit with a zero. Successful execution of this instruction converts the hexadecimal number BB in REG0 to the hexadecimal number 76. Accordingly, the contents of REG0 are compared to 76 in decision block 156. If the contents are not equal to 76, the program transfers to the fault block 135.

If the contents of REG0 are equal to 76, the subroutine continues with a test of the Increment Byte (INCB) instruction which adds one bit to the number contained in the designated register. In functional block 160, one bit is added to the number in REG0. Successful completion of this instruction increments the hexadecimal number 76 by one to the hexadecimal number 77. Thus, the contents of REG0 are compared to 77 in decision block 161. If the register content does not equal 77, the subroutine transfers to the fault block 135.

If the contents of REG0 are equal to 77, the subroutine continues with a test of the Shift Byte Right (SHRB) instruction. In functional block 165, the contents of register REG0 are shifted one bit to the right and the left bit is filled with a zero. Successful completion of this instruction converts the hexadecimal number 77 to the hexadecimal number 3B. To confirm successful operation of the microprocessor ALU, the content of REG0 is compared to 3B in decision block 166. If the register content does not equal 3B, the subroutine transfers to the fault block 135.

If the contents of REG0 are equal to 3B the subroutine continues with a test of the Decrement Byte (DECB) instruction. In functional block 170, the contents of REG0 are decremented, or reduced by one. Accordingly, if the microprocessor ALU is functioning properly, the hexadecimal number 3B is reduced to the hexadecimal number 3A. To check the result of the operation, the content of the register REG0 is compared to 3A in decision block 171. If the register REG0 does not contain 3A, the subroutine transfers to the fault block 135.

If the contents of REG0 are equal to 3A, the subroutine continues to the next sequential step which is a test of the Clear Byte (CLRB) instruction. The CLRB instruction clears a specified register by setting all the bits therein to zero. In functional block 175, register REG0 is cleared and, in decision block 176, the content of REG0 is checked. If any bits in REG0 are non-zero, the subroutine transfers to the fault block 135. If the register REG0 has been zeroed, the program continues.

Next the stack in the microprocessor Central Processing Unit (CPU) is tested by exercising the PUSH and POP instructions. In functional block 180, the hexadecimal number 3A is loaded into register REG0 in the RAM. The microprocessor CPU then loads, or "PUSHes", the address R0, which corresponds to the register REG0, onto the CPU stack. Next, the CPU transfers, or "POPs", the contents of the register having the address R0 into the Accumulator (ACCUM). Accordingly, if the microprocessor ALU is functioning properly, the hexadecimal number 3A will now be in the ACCUM. This is verified in decision block 181 with a transfer to the fault block 135 if any number other than 3A is present in the ACCUM.

In functional block 185 the hexadecimal number 3A is loaded into register REG0. The CPU is then instructed to Exchange (XCHB), or SWAP, the contents of the registers REG0 and REG 1. Successful completion of the exchange is verified in decision block 186 by checking the contents of the register REG1, which should now be the hexadecimal number 3A. If a number other than 3A is present in register REG1, the subroutine transfers to the fault block 135. Upon finding 3A in the register REG1, the subroutine continues.

In functional block 187, a subroutine, shown in blocks 188 through 190, is called to load the hexadecimal number 03 into the ACCUM. The loading is confirmed in decision block 191, with transfer to the fault block 135 if 03 is not present in the ACCUM.

The diagnostic subroutine continues with a test of the Multiply Words, Unsigned (MULU) instruction. In preparation for the test, the register REG1 is loaded with the hexadecimal number 33 in finctional block 195. The CPU is then instructed, in functional block 196, to multiply the contents of the register REG1 by the contents of the ACCUM and store the result in register REG. Since the ACCUM contains the hexadecimal number 3, successful completion of the MULU instruction should produce a product of 99 in register REG. In decision block 197, the content of the register REG is checked. If the hexadecimal number 99 is not present in the register, the subroutine transfers to the fault block 135. Otherwise, the subroutine continues.

The instruction Divide Words, Unsigned (DIVU) is exercised in finctional block 200 by dividing the content of register REG by the hexadecimal number 9, which should leave a quotient of 11 in the register REG. Accordingly, in decision block 201, the content of the register REG is checked. If the hexadecimal number 11 is not present in the register, the program transfers to the fault block 135. If the hexadecimal number 11 is present in the register REG, the program continues.

The instruction Increment Word (INC), which increments the value of the word operand by one, is exercised next in functional block 205 by adding one to the content of the register REG. Successful completion of the instruction will increase the content of the register from the hexadecimal number 11 to the hexadecimal number 12. The operation of the INC instruction is confirmed in decision block 206 by checking the content of the register REG. If the hexadecimal number 12 is not present in the register, the subroutine transfers to the fault block 135. If the hexadecimal number 12 is present in the register, the subroutine continues.

The Divide Integers (DIV) and Jump if Signed Less Than or Equal (JLE) instructions are tested in functional block 210 by causing the CPU to divide the contents of the register REG by two and to store the quotient in the register REG. The result obtained by dividing the hexadecimal number 12 by two is the hexadecimal number 9, which is verified in decision block 211. If the register REG does not contain 9, the subroutine transfers to the fault block 135. In decision block 212, the contents of the register REG are compared to the hexadecimal number 8. If the contents of the register are less than or equal to 8, the subroutine transfers to; the fault block 135. Otherwise, the subroutine continues to the next sequential step.

In functional block 215, the Set Carry Flag (SETC) instruction to "T" is tested by executing the SETC instruction and then checking the contents of the carry flag register by executing the Jump if Carry Flag is Clear (JNC) instruction. The JNC instruction will cause the subroutine to jump to the fault block 135 if the carry flag register is false, that is, contains a zero, and to sequence to the next instruction in the subroutine if the carry flag register is true, that is, contains a one. If the SETC instruction was properly executed by the microprocessor ALU, the carry flag is true and the subroutine will continue to the next sequential instruction. If the instruction did not execute, the subroutine will jump to the fault block 135.

Next, the Logical Right Shift Double-Word (SHRL) instruction is tested by loading the hexadecimal number FFFFCCCC, which requires 32 bits and is thus equivalent to a double-word, into the register REG0L. The contents of the register REG0L is then shifted right by one bit with the left most bit filled with a zero. Successful completion of this operation changes the hexadecimal number in the register from FFFFCCCC to the hexadecimal number 7FFFE666. The content of the register REG0L is checked in decision block 221. If the hexadecimal number 7FFFE666 is not present in the register, the subroutine transfers to the fault block 135. Otherwise, the subroutine continues to the final step, which is to test the instruction Arithmetic Right Shift Word (SHRA).

In functional block 225, the contents of the destination word operand of the contents of the register REG0L are shifted to the right when the SHRA instruction is executed. If the original high order bit of the destination was a one, a one is shifted into the bit. Similarly, if the original high order bit was a zero, a zero is shifted into the bit. From the preceding operation, the operand contained in the register REG0L is the hexadecimal number E666. Successful completion of the SHRA command will replace the number E666 with the hexadecimal number F333. Confirmation of the operation occurs in decision block 226 where the contents of the operand portion of the register REG0L are compared to the number F333. If the contents differ, the subroutine transfers to the fault code block 135. If the contents are F333, the diagnostic subroutine has been successfully completed and, in block 227, the control of the microprocessor 20 is returned to the main program algorithm.

The tests described above for the operation of the diagnostic subroutine, and illustrated in FIG. 5, represent all the instructions encountered during the operation of a typical ABS control algorithm. As described above, the specific tests are selected following a review of a particular control algorithm and assure that each instruction used by the microprocessor is tested once. It will be appreciated that any one of the instructions exercised by the diagnostic subroutine may be used multiple times by the microprocessor 20 during the execution of the control algorithm. However, to reduce the time required to run the diagnostic subroutine, each instruction is tested only once. Because the test is run during each iteration of the microprocessor, any malfunctioning of the microprocessor ALU will be detected before it has an adverse effect upon operation of the vehicle brake system.

It also will be appreciated that the specific diagnostic test shown in FIG. 5 is illustrative of the invention and would be modified for other ABS configurations and control algorithms to include more or less instructions. Additionally, the hexadecimal numbers described above and shown in FIG. 5 are illustrative and the invention can be practiced using other hexadecimal numbers to test specific ALU functions. Furthermore, for simplicity, only one controlled vehicle wheel was shown in FIG. 1. However, the invention can be practiced in systems where more than one wheel is controlled.

In accordance with the provisions of the patent statutes, the principle and mode of operation of this invention have been explained and illustrated in its preferred embodiment. However, it must be understood that this invention may be practiced otherwise than as specifically explained and illustrated without departing form its spirit or scope. For example, while the invention has been described as being included in anti-lock brake systems, it will be appreciated that the invention can also be applied to other computer controlled systems, such as, for example, traction control and vehicle stability control systems.

What is claimed is:

1. A controller for a hydraulic control system comprising:
   a solenoid valve adapted to control the flow of a fluid within the hydraulic control system;
   a microprocessor coupled to said solenoid valve, said microprocessor operative to actuate said valve, said microprocessor including an arithmetic logic unit, said arithmetic logic unit operable to perform specific operational functions; and
   a diagnostic subroutine accessible to said microprocessor, said diagnostic subroutine operable to exercise at least one specific arithmetic logic unit operational function to verify that said microprocessor can correctly execute said arithmetic logic unit operational function.

2. A controller according to claim 1 wherein said microprocessor is operative to periodically run said diagnostic subroutine to confirm proper operation of said microprocessor arithmetic logic unit.

3. A controller according to claim 2 wherein said diagnostic subroutine is further operable to test a plurality of arithmetic logic unit operation functions of said microprocessor.

4. A controller according to claim 3 wherein said diagnostic subroutine is further operable, upon detection of a malfunction of said microprocessor arithmetic logic unit to disable the hydraulic control system and generate a warning signal.

5. A controller according to claim 4 further including a memory coupled to said microprocessor and further wherein said diagnostic subroutine is stored in said memory.

6. A controller according to claim 5 wherein said solenoid valve is included in an anti-lock brake control system with said memory having an anti-lock brake control algorithm stored therein, said controller being operative in accordance with said anti-lock brake control algorithm to control said anti-lock brake system, and further wherein said arithmetic logic unit operational functions verified by said diagnostic subroutine are utilized during the operation of said anti-lock brake control algorithm.

7. A controller according to claim 5 wherein said solenoid valve is included in a traction control system with said memory having a traction control algorithm stored therein, said controller being operative in accordance with said traction control algorithm to control said traction control system, and further wherein said arithmetic logic unit operational functions verified by said diagnostic subroutine are utilized during the operation of said traction control algorithm.

8. An anti-lock brake system for controlling at least one wheel brake and an associated wheel in a vehicle, the controlled wheel brake being connected to a vehicle master brake cylinder, the system comprising:
   a control valve connected between the master cylinder and the controlled wheel brake for controlling the hydraulic pressure applied thereto;
   a speed sensor positioned adjacent to the controlled wheel, said speed sensor operative to generate a wheel speed signal;
   a central control unit connected to said control valve and said speed sensor, said control unit including a microprocessor having an arithmetic logic unit which is operative in accordance with a control algorithm and upon detecting a potential lock-up of the wheel associated with the controlled wheel brake to selectively operate said control valve to prevent said lock-up of the controlled wheel; and
   a diagnostic subroutine accessible by said microprocessor, said subroutine operative to exercise at least one specific operational function of said microprocessor arithmetic logic unit to verify that said microprocessor can correctly execute said operational function.

9. An anti-lock brake system according to claim 8 wherein said microprocessor is operative to periodically run said diagnostic subroutine to confirm proper operation of said microprocessor arithmetic logic unit.

10. An anti-lock brake system according to claim 9 wherein said diagnostic subroutine is included in said control algorithm.

11. An anti-lock brake system according to claim 9 wherein said diagnostic subroutine is further operable, upon detection of a malfunction of said microprocessor arithmetic logic unit to disable the anti-lock brake system and generate a warning signal.

12. An anti-lock brake system according to claim 11 wherein said diagnostic subroutine is further operable to test a plurality of arithmetic logic unit operation functions of said microprocessor.

13. An anti-lock brake system according to claim 12 wherein said arithmetic logic unit operational functions verified by said diagnostic subroutine are utilized during the operation of said anti-lock brake control algorithm.

14. A method for testing a microprocessor in an anti-lock brake system control module comprising the steps of:

(a) providing an anti-lock brake system having a control valve connected to at least one wheel brake in the brake system of a vehicle, a speed sensor for monitoring the speed of the vehicle wheel associated with the controlled wheel brake and a central control unit including a microprocessor having an arithmetic logic unit, the microprocessor being operative in accordance with a control algorithm and upon detecting a potential lock-up of the wheel associated with the controlled wheel brake, to selectively operate said control valve to prevent lock-up of the controlled wheel, the microprocessor having access to a diagnostic subroutine which is operative to exercise at least one specific operational function of the microprocessor arithmetic logic unit to verify that the microprocessor can correctly execute the operational function; and (b) running the diagnostic subroutine periodically to verify that the microprocessor arithmetic logic unit is functioning properly.

15. The method according to claim 14 wherein in step (b) the anti-lock brake system is disabled and a warning signal is sent to the vehicle operator upon detection of a microprocessor arithmetic logic unit malfunction.

16. The method according to claim 15 wherein the diagnostic subroutine is operative to exercise the microprocessor to verify that the microprocessor can correctly execute a plurality of arithmetic logic unit operational functions which are included in the control algorithm.

17. A controller for an anti-lock brake system comprising:

a microprocessor adapted to operate the anti-lock brake system, said microprocessor including an arithmetic logic unit, said arithmetic logic unit operable to perform specific operational functions; and a diagnostic subroutine accessible to said microprocessor, said diagnostic subroutine operable to exercise at least one specific arithmetic logic unit operational function to verify that said microprocessor can correctly execute said arithmetic logic unit operational function, said microprocessor being operative to periodically run said diagnostic subroutine to confirm proper operation of said microprocessor arithmetic logic unit with said diagnostic subroutine being further operable, upon detection of a malfunction of said microprocessor arithmetic logic unit to disable the anti-lock brake system and generate a warning signal.

18. A controller for a traction control system comprising:

a microprocessor adapted to operate the traction control system, said microprocessor including an arithmetic logic unit, said arithmetic logic unit operable to perform specific operational functions; and a diagnostic subroutine accessible to said microprocessor, said diagnostic subroutine operable to exercise at least one specific arithmetic logic unit operational function to verify that said microprocessor can correctly execute said arithmetic logic unit operational function, said microprocessor being operative to periodically run said diagnostic subroutine to confirm proper operation of said microprocessor arithmetic logic unit with said diagnostic subroutine being further operable, upon detection of a malfunction of said microprocessor arithmetic logic unit to disable the traction control system and generate a warning signal.

\* \* \* \* \*